US006868581B2

(12) United States Patent
Browder

(10) Patent No.: US 6,868,581 B2
(45) Date of Patent: Mar. 22, 2005

(54) GARDEN CART HANDLE

(75) Inventor: John Browder, Roanoke, TX (US)

(73) Assignee: International Development Corp., Southlake, TX (US)

( * ) Notice: Subject to any disclaimer, the term of this patent is extended or adjusted under 35 U.S.C. 154(b) by 55 days.

(21) Appl. No.: 10/456,991

(22) Filed: Jun. 6, 2003

(65) Prior Publication Data
US 2004/0244143 A1 Dec. 9, 2004

(51) Int. Cl.$^7$ .............................. A45C 13/22; B62B 7/00
(52) U.S. Cl. .................... 16/110.1; 16/444; 16/446; 280/415.1; 280/416.1; 280/491.5
(58) Field of Search ................... 16/110.1, 444, 16/445, 446, DIG. 41, DIG. 43; 280/491.2, 280/479.2, 491.1, 491.5, 408, 482, 490.1, 280/512, 510, 504, 508, 416.1, 416.2, 416.3, 280/415.1

(56) References Cited

U.S. PATENT DOCUMENTS

| | | | |
|---|---|---|---|
| 1,954,179 A | 4/1934 | Cheng | |
| 2,725,242 A | 11/1955 | Peplin | |
| 2,787,478 A * | 4/1957 | Schmidt | 280/515 |
| 3,423,781 A | 1/1969 | Henson | |
| 3,792,876 A * | 2/1974 | Norman | 280/416.1 |
| 3,936,070 A | 2/1976 | Owings | |
| 4,037,853 A | 7/1977 | Sparks | |
| 4,274,649 A | 6/1981 | Vanderhorst et al. | |
| 4,659,124 A | 4/1987 | Hillman | |
| 4,729,574 A | 3/1988 | Tipke | |
| 4,789,171 A | 12/1988 | Porter | |
| 4,991,865 A | 2/1991 | Francisco | |
| 5,146,736 A * | 9/1992 | Tonutti | 56/14.9 |
| 5,319,829 A | 6/1994 | Manuel | |
| 5,340,134 A | 8/1994 | Dodson | |
| 5,421,597 A * | 6/1995 | Berner | 280/204 |
| 5,470,088 A * | 11/1995 | Adams | 280/204 |
| 5,489,109 A | 2/1996 | Murphy | |
| 5,599,033 A | 2/1997 | Kolbus et al. | |
| 5,645,292 A | 7/1997 | McWilliams et al. | |
| 5,653,458 A | 8/1997 | Chaparian | |
| 5,816,586 A | 10/1998 | Richmond | |

(Continued)

FOREIGN PATENT DOCUMENTS

DE       3202881       8/1983

Primary Examiner—Chuck Y. Mah
(74) Attorney, Agent, or Firm—Danamraj & Youst, P.C.; Kenneth T. Emanuelson

(57) ABSTRACT

A garden cart handle having a main shank having a principal axis, a first end pivotably connectable to a garden cart and a second end opposite the first end. A handgrip portion is connected to the second end of the main shank, having a principal axis disposed substantially orthogonal to the principal axis of the main shank, a first end and a second end. A hinged portion, having an inboard end and an outboard end, is connected to the handgrip portion through a pivoting connection so as to allow the hinged portion to pivot about the principal axis of the handgrip portion. A flange is disposed on the outboard end of the hinged portion, shaped and sized to connect to a trailer tongue of a tractor. A latch is disposed on the second end of the main shank, shaped and sized to secure the hinged portion against pivoting.

20 Claims, 3 Drawing Sheets

U.S. PATENT DOCUMENTS

| | | |
|---|---|---|
| 5,915,706 A | 6/1999 | Mosley |
| 5,941,551 A * | 8/1999 | Harman et al. ............. 280/494 |
| 6,056,306 A | 5/2000 | Rust et al. |
| 6,148,477 A | 11/2000 | Cheng |
| 6,234,512 B1 | 5/2001 | Bettenhausen |
| 6,260,864 B1 | 7/2001 | Smith |
| 6,320,728 B1 * | 11/2001 | Xuan et al. .................. 360/135 |
| 6,325,395 B1 | 12/2001 | Frymoyer |
| 6,578,231 B1 * | 6/2003 | Godshaw et al. .......... 16/114.1 |
| 6,581,246 B1 * | 6/2003 | Polette ........................ 16/429 |
| D478,943 S * | 8/2003 | Kuelbs ...................... D21/425 |
| 6,640,532 B1 * | 11/2003 | Bogart et al. ............. 56/400.02 |

* cited by examiner

GARDEN CART HANDLE

FIELD OF THE INVENTION

The present invention relates generally to garden carts, and more specifically to a handle for a garden cart capable of being readily attached to a tractor or pulled by hand, as desired.

BACKGROUND OF THE INVENTION

Small garden carts are used by adults to move and carry things and are also used by children as toys. A garden cart typically includes a body that is supported upon rolling wheels. A typical garden cart also includes a handle for pulling and steering the cart. The handle has two ends, the first of which features a handgrip. The second end of the handle connects to the garden cart in a hinged fashion.

The body of a garden cart typically includes a platform surrounded by front, rear and side walls. garden cart bodies have traditionally been constructed of metal or wood or combinations thereof. Recently, however, garden cart bodies have been constructed from molded plastics, including high-density polyethylene and similar materials. Such garden carts are becoming increasingly popular because of their light weight, durability, corrosion resistance, and lower manufacturing cost.

Often, with traditional steel and/or wood bodied garden carts, the front wheels and handle of the wagon are attached to a bolster that is pivotally connected to the bottom of the wagon body. With such an arrangement, the hinged handle may be pivoted between a first position whereby the garden cart may be pulled and steered and a second position whereby a child riding in the cart may steer it, such as when being pushed or coasting down a hill. Such a configuration has been recently applied to plastic-bodied carts as well. Further weight, strength and cost benefits may be realized if the handle and bolster are also constructed from plastic.

Unfortunately, traditional garden carts are designed to either be pulled by a person or pulled by a vehicle. Carts designed to be pulled by a person are generally unsuitable for being pulled by a vehicle, and vice-versa.

SUMMARY OF THE INVENTION

In one embodiment, the present invention is a garden cart handle including a main shank having a first end and a second end and a handgrip portion, connected to the second end of the main shank, having a first end and a second end. A hinged portion is included, having a first hinge connected to the first end of the handgrip portion, a second hinge connected to the second end of the handgrip portion, and a flange shaped and sized to connect to the tongue of a tractor.

In a second embodiment, the present invention is a garden cart handle including a main shank having a principal axis, a first end and a second end, and a handgrip portion, connected to the second end of the main shank, having a first end and a second end. A generally-planar hinged portion having a principal plane includes a first hinge connected to the first end of the handgrip portion and a second hinge connected to the second end of the handgrip portion. The generally-planar hinged portion also includes an opening spanning from the first hinge to the second hinge, a first bore extending through the hinged portion having an axis disposed normal to the principal plane of the hinged portion, and a flange having a second bore therein having an axis collinear to the axis of the first bore.

In a third embodiment, the invention comprises a garden cart handle including a main shank having a principal axis, a first end pivotably connectable to a garden cart and a second end opposite the first end. A handgrip portion is connected to the second end of the main shank, having a principal axis disposed substantially orthogonal to the principal axis of the main shank, a first end and a second end. A hinged portion, having an inboard end and an outboard end, is connected to the handgrip portion through a pivoting connection so as to allow the hinged portion to pivot about the principal axis of the handgrip portion. A flange is disposed on the outboard end of the hinged portion, shaped and sized to connect to a tongue of a tractor. A latch is disposed on the second end of the main shank, shaped and sized to secure the hinged portion against pivoting.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
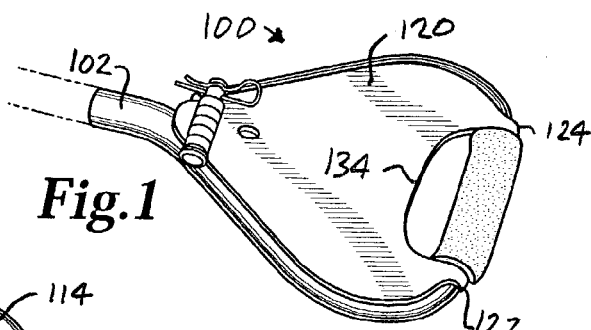
FIG. 1 is a three-dimensional view of a garden cart handle in accordance with one embodiment of the present invention.
Figure 2:
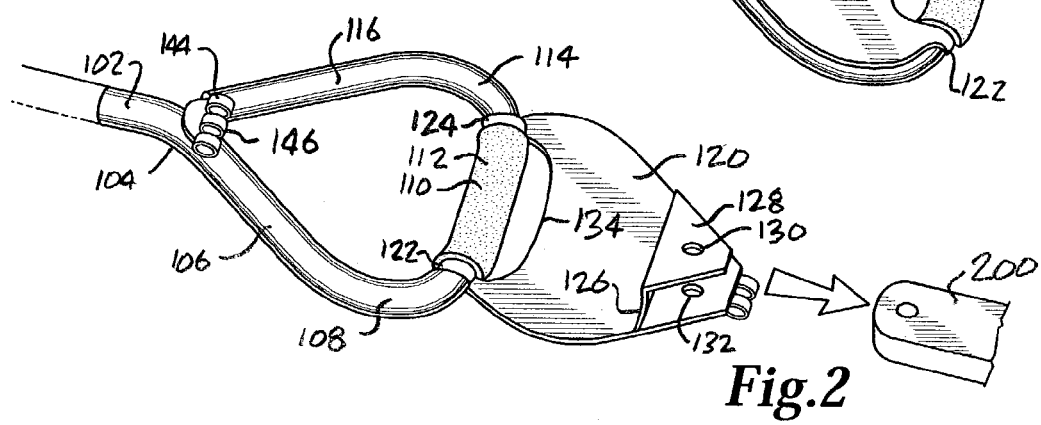
FIG. 2 is a three-dimensional view of the garden cart handle of FIG. 1.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

FIGS. 1–10 depict one end of a garden cart handle 100 in accordance with one embodiment of the present invention. Garden cart handle 100 includes a main shank 102 having a generally cylindrical cross-section, a principal axis and a first curved segment 104 disposed at the distal end thereof. First curved segment 104 has a proximal end connected to the distal end of the main shank 102 and a distal end. The proximal end of the first curved segment 104 extends tangentially from the distal end of the main shank 102. The curvature of the first curved segment 104 may have a constant radius, or may vary along the length of first curved segment 104.

A first angled segment 106 has a generally-cylindrical cross-section, a proximal end disposed at the distal end of the first curved segment 104 and a distal end. The proximal end of the first angled segment 106 extends tangentially from the distal end of the first curved segment 104 along a principal axis disposed at an obtuse angle to the principal axis of the main shank 102, although lying in substantially the same principal plane.

A second curved segment 108 has a proximal end disposed at the distal end of the first angled segment 106 and a distal end. The proximal end of the second curved segment 108 extends tangentially from the distal end of the first angled segment 106. The curvature of the second curved segment 108 may have a constant radius, or may vary along the length of second curved segment 108.

A generally-cylindrical handgrip segment 110 has a proximal end disposed at the distal end of the second curved segment 108 and a distal end. The proximal end of the handgrip segment 110 extends tangentially from the distal end of the second curved segment 108 along a principal axis substantially normal to the principal axis of the main shank 102, although lying in substantially the same principal plane. In the embodiment shown in FIGS. 1–10, handgrip segment 110 has a pad 112 disposed thereabout so as to increase user comfort when pulling the garden cart to which garden cart handle 100 is attached.

A third curved segment 114 has a proximal end disposed at the distal end of the handgrip segment 110 and a distal end. The proximal end of third curved segment extends tangentially from the distal end of the handgrip segment 110. The curvature of the third curved segment 114 may have a constant radius, or may vary along the length of third curved segment 114.

A second angled portion 116 has a proximal end disposed at the distal end of the third curved segment 114 and a distal end disposed at the distal end of the main shank 102. The proximal end of the second angled segment 116 extends tangentially from the distal end of the third curved segment 114 along a principal axis at an obtuse angle to the principal axis of the main shank 102, although lying in substantially the same principal plane.

A generally-planar hinged portion 120 is connected to garden cart handle 100 by hinges 122 and 124. Hinge 122 is attached to the garden cart handle 100 in the vicinity of the proximal end of the handgrip segment 110, while hinge 124 is attached to the garden cart handle 100 in the vicinity of the distal end of the handgrip segment 110. Attached in this manner, hinged portion 120 is able to rotate freely about the principal axis of handgrip segment 110 unless constrained.

A generally-trapezoidal wall 126 has a proximal end connected to one side of the hinged portion 120, extending normally therefrom to a distal end. A generally-trapezoidal flange 128 is connected to the distal end of the generally-trapezoidal wall 126. Flange 128 lies in a plane substantially-parallel to the principal plane of hinged portion 120, but offset by a distance substantially equal to the height of wall 126.

A bore 130 having a principal axis normal to flange 128 extends through flange 128 approximately in the center thereof. A second bore 132, having a principal axis substantially collinear to the principal axis of bore 130, extends through hinged portion 120. Bores 130 and 132 have approximately the same diameter. Disposed between hinge 122 and hinge 124 is a cutout 134 shaped and sized to facilitate gripping of the handgrip segment 110 of garden cart handle 100.

Disposed on the opposite side of hinged portion 120 from flange 128 is a latch 140 composed of a set of circular loops 142. A mating latch 144, having a complementary set of circular loops 146, is disposed at the distal end of the main shank 102 of garden cart handle 100. The inside diameters of circular loops 142 and circular loops 146 are sized to receive latch pin 148. When circular loops 142 and circular loops 146 are aligned, latch pin 148 can be disposed within them so as to latch the hinged portion 120 in place.

With latch pin 148 disposed within circular loops 142 and circular loops 146 and hinged portion 120 thereby fixed in place, garden cart handle 100 is set up for manipulation by a user's hand acting on handgrip portion 110. In addition to this "manual" mode of operation, garden cart handle 100 can also be readily used for powered towing by a tractor. FIGS. 2–8 depict the method of attachment of garden cart handle 100 to the tongue of a tractor used for pulling the garden cart.

Figure 3:
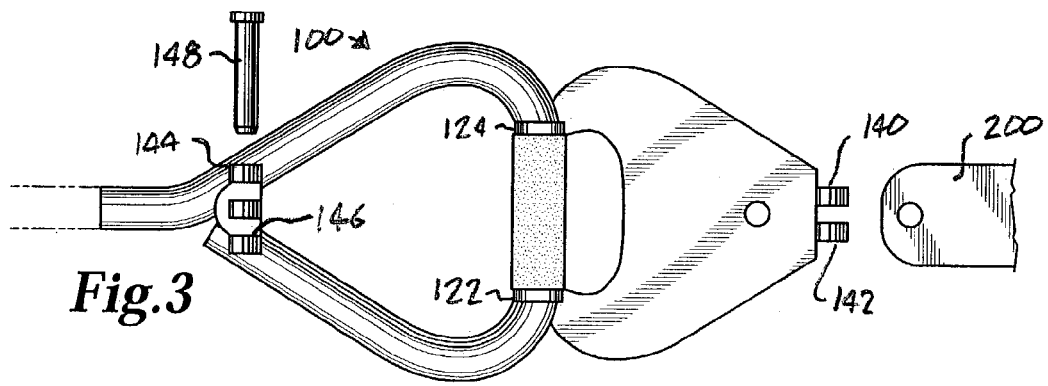
FIG. 3 is a bottom view of the garden cart handle of FIGS. 1 and 2.
Figure 4:
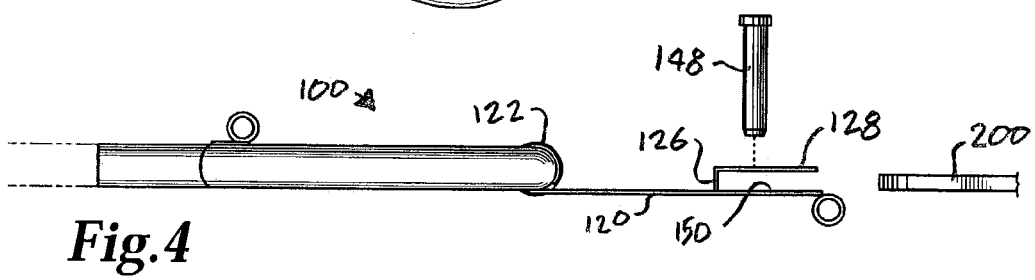
FIG. 4 is a side view of the garden cart handle of FIGS. 1–3.
Figure 5:
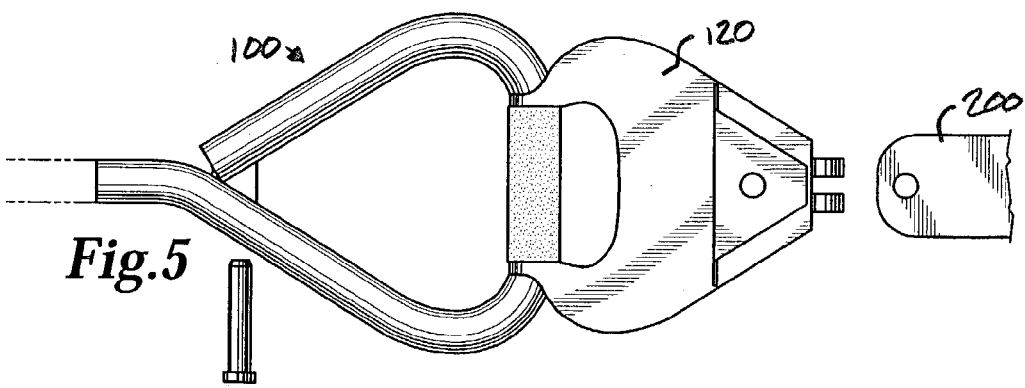
FIG. 5 is a top view of the garden cart handle of FIGS. 1–4.
Figure 6:
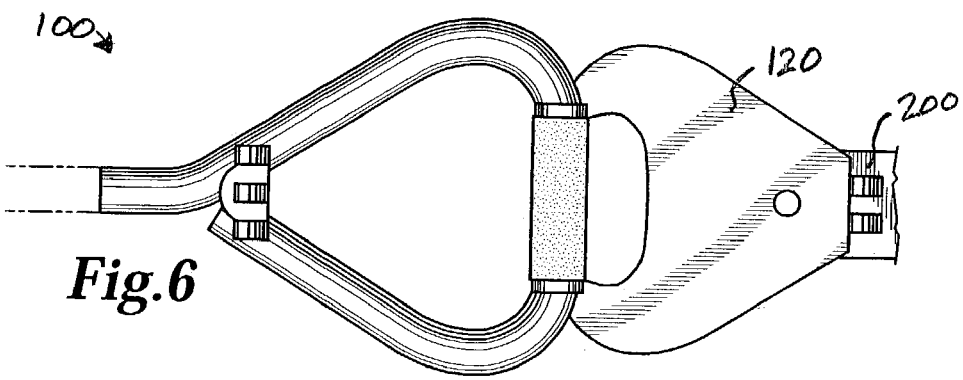
FIG. 6 is a bottom view of the garden cart handle of FIGS. 1–5.
Figure 7:
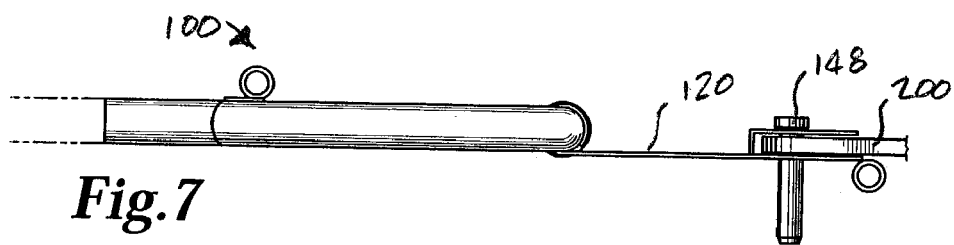
FIG. 7 is a side view of the garden cart handle of FIGS. 1–6.
Figure 8:
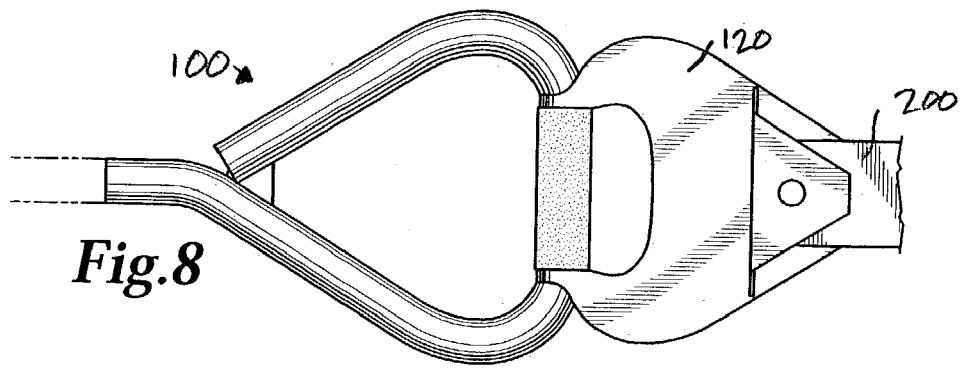
FIG. 8 is a top view of the garden cart handle of FIGS. 1–7.

Latch pin 148 is first removed from the mated set of circular loops 142 and circular loops 146, thereby allowing hinged portion 120 to rotate about hinges 122 and 124 from an inboard orientation to an outboard orientation. The outboard end of hinged portion 120 is then aligned to the tongue 200 of a tractor, as shown in FIGS. 2–5. The tongue 200 is first guided into the space between the upper surface 150 of the hinged portion 120 and the flange 128, as seen in FIGS. 3 though 6. After the tongue 200 is disposed between upper surface 150 and flange 128, the pin bore 202 is aligned to the bore 130 in the flange 128 and the bore 132 in the hinged portion 120. After pin bore 202 is aligned to bores 130 and 132, latch pin 148 can be inserted through bores 130, 132 and pin bore 202, thereby mechanically connecting hinged portion 120, and therefore garden cart handle 100, to tongue 200. Connected in this manner, the tractor to which tongue 200 is attached can tow the garden cart to which garden cart handle 100 is connected.

Figure 9:
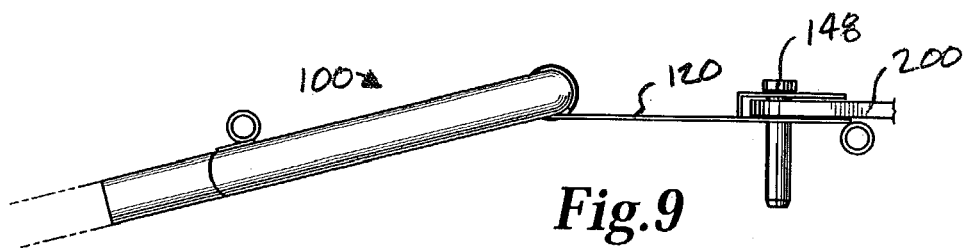
FIGS. 9 and 10 are side views of the garden cart handle of FIGS. 1–8.
Figure 10:
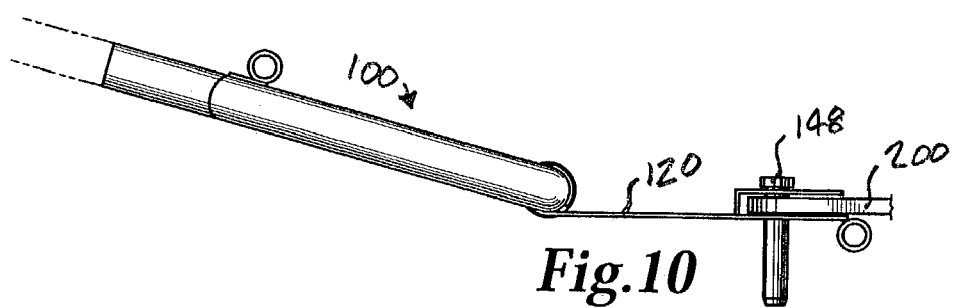
Figure 11:
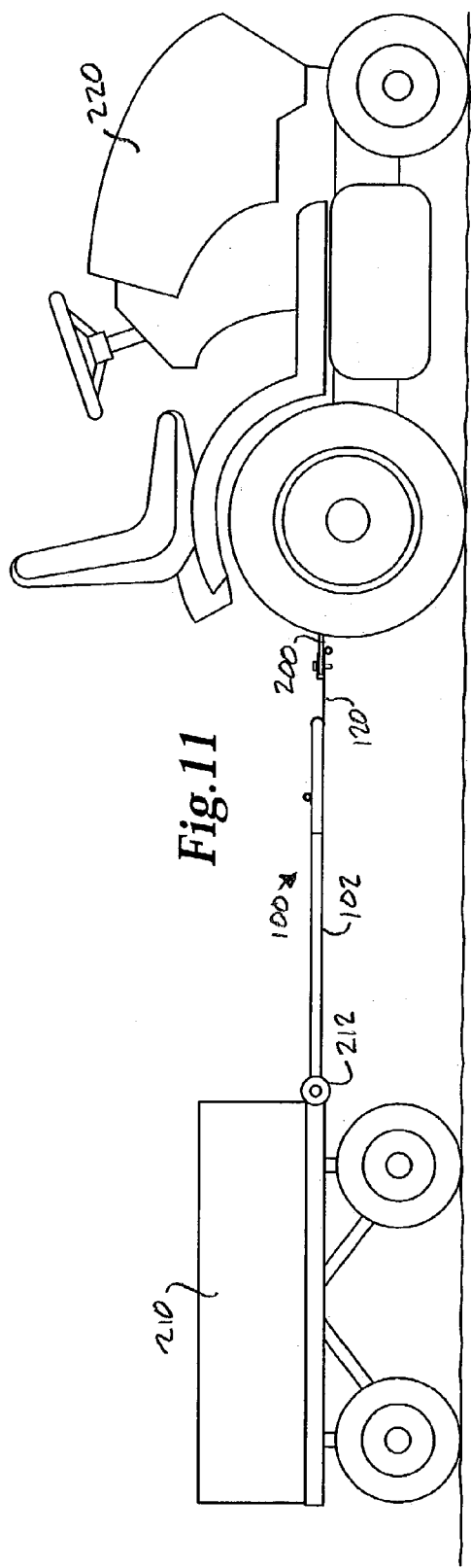
FIGS. 11 and 12 are side views of a garden cart and tractor assembly connected using the garden cart handle of FIGS. 1–10.
Figure 12:
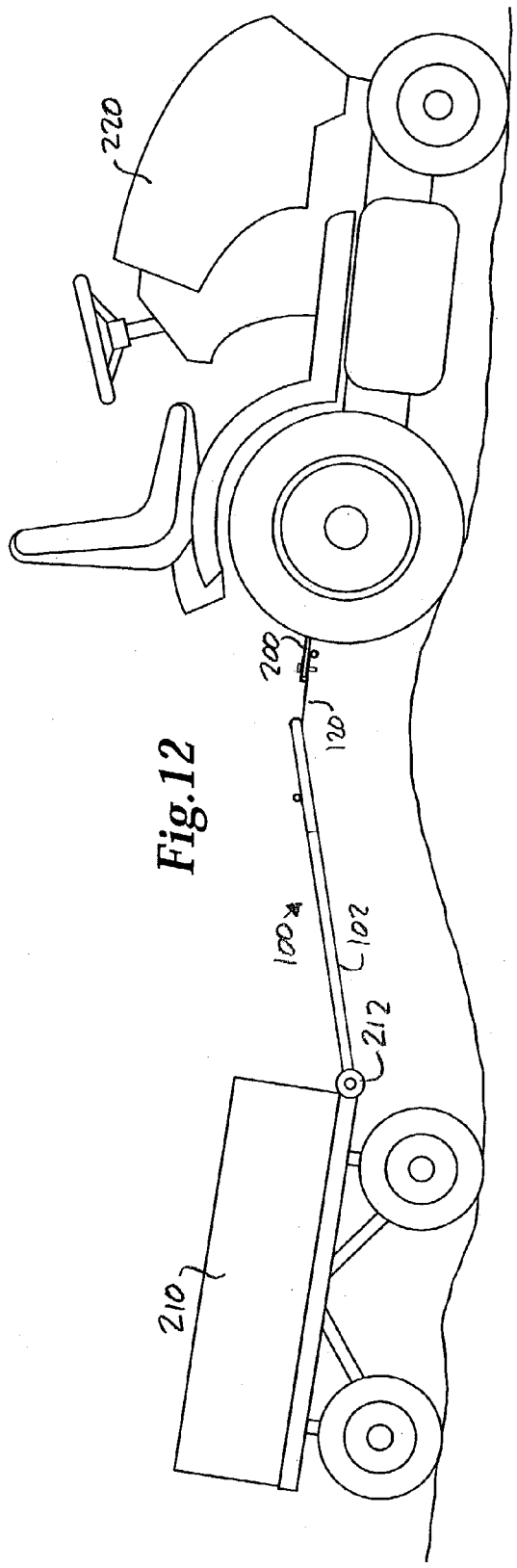

FIGS. 9–12 depict the manner in which hinges 122 and 124 allow the garden cart handle 100 to be used to tow a garden cart, such as garden cart 210, over uneven terrain. In these figures, it can be seen that, although the hinged portion 120 remains aligned with the main shank 102 over flat terrain, as shown in FIG. 11, a degree of compliance is necessary for towing of garden cart 210 over uneven terrain, as shown in FIGS. 9, 10 and 12.

In those circumstances in which garden cart 210 is at a different elevation, or disposed at a different pitch, than the towing vehicle, such as tractor 220, a degree of compliance about the pitch axis is necessary. Although the pinned connection between hinged portion 120 and tongue 200 provides for a substantial degree of compliance about the yaw, or vertical axis, the manner of connection between hinged portion 120 and tongue 200 is such that only a very small degree of compliance in pitch is provided. Compliance about the pitch axis is provided, therefore, through the hinged connection provided by hinges 122 and 124. Additionally, garden cart handle 100 may be connected to garden cart 210 through a pivoting connection 212 allowing for pitch compliance, thereby allowing tractor 220 to securely tow garden cart 210 while allowing maximum ground contact and traction for both.

Although preferred embodiments of the invention have been described in detail, it will be understood by those skilled in the art that various modifications can be made therein without departing from the spirit and scope of the invention as set forth in the appended claims.

What is claimed is:

1. A garden cart handle comprising:
   a main shank having a first end and a second end;
   a handgrip portion, connected to the second end of the main shank, having a first end and a second end;
   a hinged portion, having an inboard end and an outboard end and having
      a first hinge, disposed on the inboard end of the hinged portion and connected to the first end of the handgrip portion,
      a second hinge, disposed on the inboard end of the hinged portion and connected to the second end of the handgrip portion, and
      a flange, disposed on the outboard end of the hinged portion and shaped and sized to connect to the tongue of a tractor.

2. The handle of claim 1 wherein the flange has a bore disposed therein having a first diameter.

3. The handle of claim 2 wherein the first diameter is sized to match the diameter of a bore disposed in the tongue of a tractor.

4. The handle of claim 1 further comprising a latch disposed to secure the hinged portion from pivoting about the first and second hinges.

5. The handle of claim 4 wherein the latch has a bore disposed therein having an internal diameter.

6. The handle of claim 5 further comprising a pin, disposed in the latch of the bore, having an external diameter matching the internal diameter.

7. The handle of claim 6 wherein the external diameter of the pin is sized to match the diameter of a bore disposed in the tongue of a tractor.

8. A garden cart handle comprising:
   a main shank having a principal axis, a first end and a second end;
   a handgrip portion, connected to the second end of the main shank, having a first end and a second end;
   a generally-planar hinged portion having
      a principal plane,
      a first hinge connected to the first end of the handgrip portion,
      a second hinge connected to the second end of the handgrip portion,
      an opening spanning from the first hinge to the second hinge,
      a first bore extending through the hinged portion having an axis disposed normal to the principal plane of the hinged portion, and
      a flange having a second bore therein having an axis collinear to the axis of the first bore.

9. The handle of claim 8 wherein the handgrip portion is generally-cylindrical and has a principal cylindrical axis, and wherein the principal cylindrical axis is disposed orthogonal to the principal axis of the main shank.

10. The handle of claim 8 wherein the handgrip portion is connected to the second end of the main shank by an angled portion.

11. The handle of claim 8 further comprising a latch, shaped and oriented to restrict the motion of the hinged portion about the handgrip portion, attached to the second end of the main shank.

12. The handle of claim 11 wherein the latch comprises one or more hollow cylindrical segments.

13. The handle of claim 12 wherein the one or more hollow cylindrical segments are aligned along an axis disposed orthogonal to the principal axis of the main shank.

14. The handle of claim 12 wherein the one or more hollow cylindrical segments are aligned along an axis disposed parallel to the principal axis of the main shank.

15. A garden cart handle comprising:
   a main shank having a principal axis, a first end pivotably connectable to a garden cart and a second end opposite the first end;
   a handgrip portion, connected to the second end of the main shank, having a principal axis disposed substantially orthogonal to the principal axis of the main shank, a first end and a second end;
   a hinged portion, having an inboard end and an outboard end, connected to the handgrip portion through a pivoting connection so as to allow the hinged portion to pivot about the principal axis of the handgrip portion;
   a flange, disposed on the outboard end of the hinged portion, shaped and sized to connect to a tongue of a tractor; and
   a latch, disposed on the second end of the main shank, shaped and sized to secure the hinged portion against pivoting.

16. The handle of claim 15 wherein the handgrip portion is connected to the second end of the main shank by an angled portion.

17. The handle of claim 15 wherein the latch comprises one or more hollow cylindrical segments.

18. The handle of claim 17 wherein the one or more hollow cylindrical segments are aligned along an axis disposed orthogonal to the principal axis of the main shank.

19. The handle of claim 17 wherein the one or more hollow cylindrical segments are aligned along an axis disposed parallel to the principal axis of the main shank.

20. The handle of claim 19 wherein the hinged portion comprises one or more hollow cylindrical segments positioned to interlock with the one or more hollow cylindrical segments of the latch.

* * * * *